US011952951B2

(12) United States Patent
Redon et al.

(10) Patent No.: US 11,952,951 B2
(45) Date of Patent: Apr. 9, 2024

(54) THERMAL MANAGEMENT OF AFTERTREATMENT DEVICES OF OPPOSED-PISTON ENGINES UNDER MOTORING CONDITIONS

(71) Applicant: ACHATES POWER, INC., San Diego, CA (US)

(72) Inventors: Fabien G. Redon, San Diego, CA (US); Arunandan Sharma, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 0 days.

(21) Appl. No.: 17/735,923

(22) Filed: May 3, 2022

(65) Prior Publication Data

US 2022/0260028 A1 Aug. 18, 2022

Related U.S. Application Data

(60) Division of application No. 16/735,247, filed on Jan. 6, 2020, now abandoned, which is a continuation of
(Continued)

(51) Int. Cl.
*F02D 41/02* (2006.01)
*F02B 25/08* (2006.01)
(Continued)

(52) U.S. Cl.
CPC .......... *F02D 41/0235* (2013.01); *F02B 25/08* (2013.01); *F02B 75/282* (2013.01);
(Continued)

(58) Field of Classification Search
CPC ............... F01B 7/14; F01N 2900/1404; F01N 2900/1411; F01N 9/00; F02B 2075/025;
(Continued)

(56) References Cited

U.S. PATENT DOCUMENTS 5,094,206 A 3/1992 Buslepp et al. .............. 123/325
9,574,524 B2 2/2017 Alm ..................... F02M 31/083
(Continued)

FOREIGN PATENT DOCUMENTS

JP 2009191745 8/2009
WO WO-2013/126347 A1 8/2013
(Continued)

OTHER PUBLICATIONS

International Preliminary Report on Patentability, dated Mar. 11, 2021, for PCT application No. PCT/US2019/047772.
(Continued)

*Primary Examiner* — Grant Moubry
*Assistant Examiner* — Ruben Picon-Feliciano
(74) *Attorney, Agent, or Firm* — Terrance A. Meador

(57) ABSTRACT

A method of operating a two-stroke cycle, opposed-piston engine comprising a pumping device coupled to pump air to cylinders of the engine through a charge air cooler and an aftertreatment system of thermally-activated devices coupled to receive exhaust from the cylinders by which a thermal state of the exhaust sufficient to sustain thermal activation of one or more of the aftertreatment system devices may be maintained during a deceleration or motoring condition of operation by reducing the mass airflow to the engine.

20 Claims, 3 Drawing Sheets

Related U.S. Application Data application No. PCT/US2019/047772, filed on Aug. 22, 2019.

(60) Provisional application No. 62/725,199, filed on Aug. 30, 2018.

(51) Int. Cl.
*F02B 37/04* (2006.01)
*F02B 75/02* (2006.01)
*F02B 75/28* (2006.01)
*F02D 23/00* (2006.01)
*F02D 41/00* (2006.01)
*F02D 43/00* (2006.01)

(52) U.S. Cl.
CPC ......... *F02D 23/00* (2013.01); *F02D 41/0007* (2013.01); *F02D 43/00* (2013.01); *F02B 37/04* (2013.01); *F02B 2075/025* (2013.01); *F02D 2200/0802* (2013.01)

(58) Field of Classification Search
CPC ...... F02B 25/08; F02B 29/04; F02B 29/0412; F02B 37/04; F02B 37/18; F02B 39/10; F02B 75/28; F02B 75/282; F02D 2200/021; F02D 2200/0406; F02D 2200/0414; F02D 2200/0802; F02D 2200/703; F02D 23/00; F02D 2400/04; F02D 41/0005; F02D 41/0007; F02D 41/0055; F02D 41/0235; F02D 41/123; F02D 43/00; Y02T 10/12; Y02T 10/40
See application file for complete search history.

(56) References Cited

U.S. PATENT DOCUMENTS

| | | | |
|---|---|---|---|
| 9,840,972 B2 | 12/2017 | Bevan et al. | ........... F02B 33/44 |
| 2012/0059572 A1* | 3/2012 | Larsson | ................. F02M 26/05 |
| | | | 701/112 |
| 2012/0210985 A1* | 8/2012 | Fuqua | ................... F02B 75/282 |
| | | | 123/321 |
| 2014/0069085 A1 | 3/2014 | Alm | ....................... F02M 25/07 |
| 2014/0298802 A1 | 10/2014 | Suzuki et al. | .................. 60/602 |
| 2014/0373815 A1 | 12/2014 | Nagar et al. | ............ F02B 75/28 |
| 2015/0033736 A1 | 2/2015 | Kalebjian et al. | .... F01N 3/2006 |
| 2016/0160781 A1 | 6/2016 | Nagar et al. | .......... F02D 41/221 |
| 2017/0044998 A1 | 2/2017 | Holub et al. | .............. F02D 9/02 |
| 2017/0122234 A1 | 5/2017 | Kuechler et al. | ... F02D 41/0087 |
| 2020/0173387 A1 | 4/2020 | Redon et al. | ........... F02D 41/02 |

FOREIGN PATENT DOCUMENTS

| | | |
|---|---|---|
| WO | WO-2015/093204 A1 | 6/2015 |
| WO | WO-2015/192859 A1 | 12/2015 |
| WO | WO-2017/127219 A1 | 7/2017 |
| WO | WO-2020/046718 A1 | 3/2020 |

OTHER PUBLICATIONS

Ramesh, A., Gosala, D., Allen, C., Joshi, M. et al., "Cylinder Deactivation for Increased Engine Efficiency and Aftertreatment Thermal Management in Diesel Engines," SAE Technical Paper 2018-01-0384, 2018, https://doi.org/10.4271/2018-01-0384.

Samrat Patil, Ahmad Ghazi, Fabien Redon, Christopher Sharp, Dan Schum, John Headley, "Cold Start HD FTP Results on Multi-Cylinder Opposed-Piston Engine Demonstrating Rapid Exhaust Enthalpy Rise to Achieve Ultra Low NOx", SAE Technical Paper 2018-01-1378, 2018 (published Apr. 3, 2018).

Abhishek Sahasrabudhe, Samrat Patil, "Cold start WHTG transient results on Multi-cylinder Opposed-Piston Engine demonstrating low $CO_2$ emissions while meeting BS-VI emission targets and enabling aftertreatment optimization", SIAT 2019, 19SIAT-0458, (published Jan. 2019).

* cited by examiner

THERMAL MANAGEMENT OF AFTERTREATMENT DEVICES OF OPPOSED-PISTON ENGINES UNDER MOTORING CONDITIONS

PRIORITY

This application claims priority as a divisional of U.S. application Ser. No. 16/735,247, filed Jan. 6, 2020, which is a continuation of PCT application PCT/US2019/047772, filed Aug. 22, 2019, which claims priority to US provisional application for patent 62/725,199, filed Aug. 30, 2018.

TECHNICAL FIELD

The field is exhaust management strategies of two-stroke cycle, opposed-piston engines which maintain exhaust temperatures at levels suitable for effective operation of aftertreatment devices.

BACKGROUND

A two-stroke cycle engine is an internal combustion engine that completes a cycle of operation with a single complete rotate on of a crankshaft and two strokes of a piston connected to the crankshaft. The strokes are typically denoted as compression and power strokes. One example of a two-stroke cycle engine is an opposed-piston engine in which two pistons are disposed in the bore of a cylinder for reciprocating movement in opposing directions along the central axis of the cylinder. Each piston moves between a bottom center (BC) location where it is nearest one end of the cylinder and a top center (TC) location within the cylinder where it is furthest from the one end. The cylinder has ports formed in the cylinder sidewall near respective BC piston locations. Each of the opposed pistons controls one of the ports, opening the port as it moves to its BC location, and closing the port as it moves from BC toward its TC location. One of the ports serves to admit charge air (sometimes called "scavenging air") into the bore, the other provides passage for the products of combustion out of the bore; these are respectively termed "intake" and "exhaust" ports (in some descriptions, intake ports are referred to as "air" ports or "scavenge" ports). In a uniflow-scavenged opposed-piston engine, pressurized charge air enters a cylinder through its intake port as exhaust gas flows out of its exhaust port, thus gas flows through the cylinder in a single direction ("uniflow")—from intake port to exhaust port.

The opposed-piston engine has an air handling system that manages the transport of charge air provided to, and exhaust gas produced by, the engine during operation of the engine. A representative air handling system construction includes a charge air subsystem and an exhaust subsystem. The charge air subsystem receives and compresses air and includes a charge air channel that delivers the compressed air to the intake port or ports of the engine. The charge air subsystem may comprise one or both of a turbine-driven compressor and a supercharger. The charge air channel typically includes at least one air cooler that is coupled to receive and cool the charge air (or a mixture of gasses including charge air) before delivery to the intake ports of the engine. The exhaust subsystem includes an exhaust channel that transports exhaust gas from engine exhaust for delivery to other exhaust subsystem components such as a turbine that drives the compressor, an exhaust gas recirculation (EGR) loop, and one or more aftertreatment devices.

As in conventional four-stroke engines the aftertreatment devices of opposed-piston engines cleanse exhaust gas of undesirable components as it is transported through the devices before being emitted into the atmosphere. The aftertreatment devices are constructed to convert components such as soot, NOx, and unburned hydrocarbons in the exhaust gas into harmless compounds by thermally-driven processes that may include one or more of catalyzation, decomposition, and filtration. The heat that causes the devices to operate is obtained from the exhaust gas itself, and the devices operate most effectively when exhaust gas temperatures are relatively high. One goal of an exhaust strategy for internal combustion engines equipped with aftertreatment devices is to maintain exhaust temperatures within a range of temperatures where the devices work most effectively. Ramesh, A. K., Gosala, D. B., Allen, C., Joshi, M., McCarthy Jr., J., Farrell, L., Koeberlein, E. D., and Shaver, G., "Cylinder Deactivation for Increased Engine Efficiency and Aftertreatment Thermal Management in Diesel Engines," SAE Technical Paper 2018-01-384, 2018.

One engine operating condition which presents a challenge for such a strategy is motoring. In this regard, presume that the engine is installed in a vehicle, in which case motoring occurs during deceleration of the vehicle when the provision of fuel to the engine is interrupted and the engine continues to run in response to the vehicle's inertia. Motoring occurs in a dynamometer when the engine is run, without provision of fuel, by application of power to the engine's power train by a separate motor. The absence of combustion during motoring cools down exhaust flow which reduces the temperature of the aftertreatment devices. When deceleration is followed by acceleration and fueling, combustion occurs and mass exhaust flow is heated, thereby again heating exhaust flow. However, if the motoring period results in reduction of aftertreatment temperatures to suboptimal or non-operating levels, there may be an initial period of acceleration when undesirable emissions increase before the aftertreatment devices are once again heated to effective levels by the mass exhaust flow.

The goal of exhaust temperature maintenance may be attained by a management process that reduces the flow of air through the engine, which may result in higher exhaust temperatures. Ramesh, et al., op. cit. An opposed-piston engine operated in a two-stroke cycle mode has no intake stroke with which to pump air through the engine. Instead the air handling system comprises one or more devices for this purpose. In many cases the preferred pumping device is a supercharger. Manifestly, when the engine is motored in a moving vehicle (or in a dynamometer) by cessation of fueling, operation of the pumping device continues to push air through the engine, often through a charge air cooler. The continued flow of air unheated by combustion may cool aftertreatment devices and make them ineffective—causing emission of undesirable exhaust components for a period of time after resumption of combustion while the devices are brought to their effective operating temperatures.

SUMMARY

Certain embodiments of the invention include a method of operating a fuel-injected, opposed-piston engine comprising a pumping device coupled to pump air to cylinders of the engine and an aftertreatment system of thermally-activated devices coupled to receive exhaust from the cylinders by which a thermal state of the mass exhaust flow sufficient to sustain thermal activation of one or more of the aftertreatment system devices may be maintained during a deceleration or motoring condition of operation by reducing the mass airflow to the engine.

In some embodiments, a thermal state of the mass exhaust flow sufficient to sustain thermal activation of one or more of the aftertreatment system devices may be maintained during deceleration of the engine by recirculating a portion of the mass airflow to an inlet of the pumping device.

In some other embodiments, a thermal state of the mass exhaust flow sufficient to sustain thermal activation of one or more of the aftertreatment system devices may be maintained during motoring of the engine by recirculating a portion of the mass airflow to an inlet of the pumping device.

DETAILED DESCRIPTION

Figure 1:
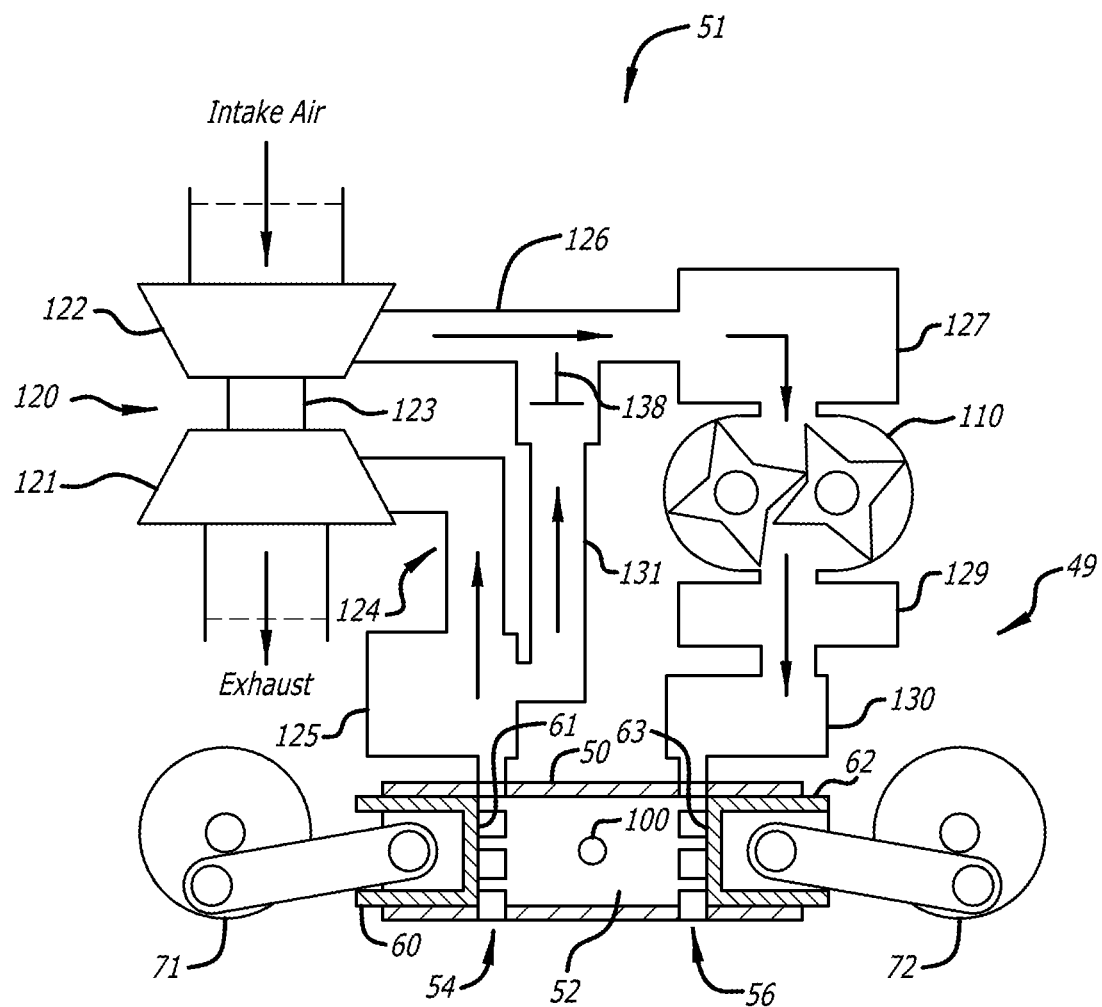
FIG. 1 is a schematic diagram of an opposed-piston engine equipped with an air handling system with an EGR loop and is properly labeled "Prior Art".

With reference to FIG. 1, a two-stroke cycle internal combustion engine is embodied in an opposed-piston engine 49 having at least one ported cylinder 50. For example, the engine may have one ported cylinder, two ported cylinders, three ported cylinders, or four or more ported cylinders. Each ported cylinder 50 has a bore 52 and exhaust and intake ports 54 and 56 formed or machined in the vicinity of respective ends of a cylinder wall. Each of the ports 54 and 56 includes one or more circumferential arrays of openings in which adjacent openings are separated by a solid bridge. In some descriptions, each opening is referred to as a "port"; however, the construction of a circumferential array of such "ports" is no different than the port constructions shown in FIG. 1. Pistons 60 and 62 are slideably disposed in the bore 52 of each cylinder with their end surfaces 61 and 63 opposing one another. Movements of the pistons 60 control the operations of the exhaust ports 54. Movements of the pistons 62 control the operations of the intake ports 56. Thus, the ports 54 and 56 are referred to as "piston controlled ports". Pistons 60 controlling the exhaust ports ("exhaust pistons") are coupled to a crankshaft 71. Pistons 62 controlling the intake ports of the engine ("intake ports") are coupled to a crankshaft 72.

As pistons 60 and 62 approach respective TC locations, a combustion chamber is defined in the bore 52 between the end surfaces 61 and 63. Fuel is injected directly into the combustion chamber through at least one fuel injector nozzle 100 positioned in an opening through the sidewall of a cylinder 50. The fuel mixes with charge air admitted through the intake port 54. As the mixture is compressed between the end surfaces it reaches a temperature that causes the fuel to ignite; in some instances, ignition may be assisted, as by spark or glow plugs. Combustion follows.

With further reference to FIG. 1, the engine 49 includes an air handling system 51 that manages the transport of charge air provided to, and exhaust gas produced by, the engine 49. A representative air handling system construction includes a charge air subsystem and an exhaust subsystem. In the air handling system 51, the charge air subsystem includes a charge air source that receives intake air and processes it into charge air, a charge air channel coupled to the charge air source through which charge air is transported to the at least one intake port of the engine, and at least one air cooler in the charge air channel that is coupled to receive and cool the charge air before delivery to the intake port or ports of the engine. Such a cooler can comprise an air-to-liquid and/or an air-to-air device, or another cooling device. Hereinafter, such a cooler is denoted as a "charge air cooler". The charge air subsystem also includes a supercharger that pumps charge air in the charge air channel to intake ports of the engine. The exhaust subsystem includes an exhaust channel that transports exhaust products from exhaust ports of the engine to an exhaust outlet.

As per FIG. 1, the preferred charge air subsystem includes a supercharger 110, which can be driven by an electrical motor, or by a gear, chain, or belt apparatus coupled to a crankshaft. The supercharger 110 can be a single-speed or multiple-speed device, or a fully variable-speed device. In some aspects, the air management system 51 includes a turbocharger 120 with a turbine 121 and a compressor 122 that rotate on a common shaft 123. The turbine 121 is coupled to the exhaust subsystem and the compressor 122 is coupled to the charge air subsystem. The turbine 121 can be a fixed-geometry or a variable-geometry device. The turbocharger 120 extracts energy from exhaust gas that exits the exhaust ports 54 and flows into the exhaust channel 124 directly from the exhaust ports 54, or from an exhaust manifold 125. In this regard, the turbine 121 is rotated by exhaust gas passing through it. This rotates the compressor 122, causing it to generate charge air by compressing intake air. The charge air output by the compressor 122 flows through a conduit 126 to a charge air cooler 127, whence it is pumped by the supercharger 110 to the intake ports. Air compressed by the supercharger 110 is output from the supercharger through a charge air cooler 129 to an intake manifold 130. The intake ports 56 receive charge air pumped by the supercharger 110, through the intake manifold 130. Preferably, but not necessarily, in multi-cylinder opposed-piston engines, the intake manifold 130 is constituted of an intake plenum that communicates with the intake ports 56 of all cylinders 50.

The air handling system 51 may be equipped to control emissions of nitrous oxide (NOx) by recirculating exhaust gas through the one or more cylinders of the opposed-piston engine. The recirculated exhaust gas is mixed with charge air to lower peak combustion temperatures, which lowers NOx emissions. This process is referred to as exhaust gas recirculation ("EGR"). The opposed-piston engine 49 seen in FIG. 1 may be equipped with an EGR loop that channels exhaust gas from the exhaust subsystem into the charge air subsystem. An example of a specific EGR loop construction (which is not intended to be limiting) is a high pressure configuration illustrated in FIG. 1. In this regard, a high pressure EGR loop circulates exhaust gas obtained from a source upstream of the turbine 121 to a mixing point downstream of the compressor 122. In this EGR loop the conduit 131 and an EGR valve 138 shunt a portion of the exhaust gas from the exhaust manifold 125 to be mixed with charge air output by the compressor 122 into the conduit 126. If no exhaust/air mixing is required the valve 138 is fully shut and charge air with no exhaust gas is delivered to the cylinders. As the valve 138 is increasingly opened, an increasing amount of exhaust gas is mixed into the charge air.

Figure 2:
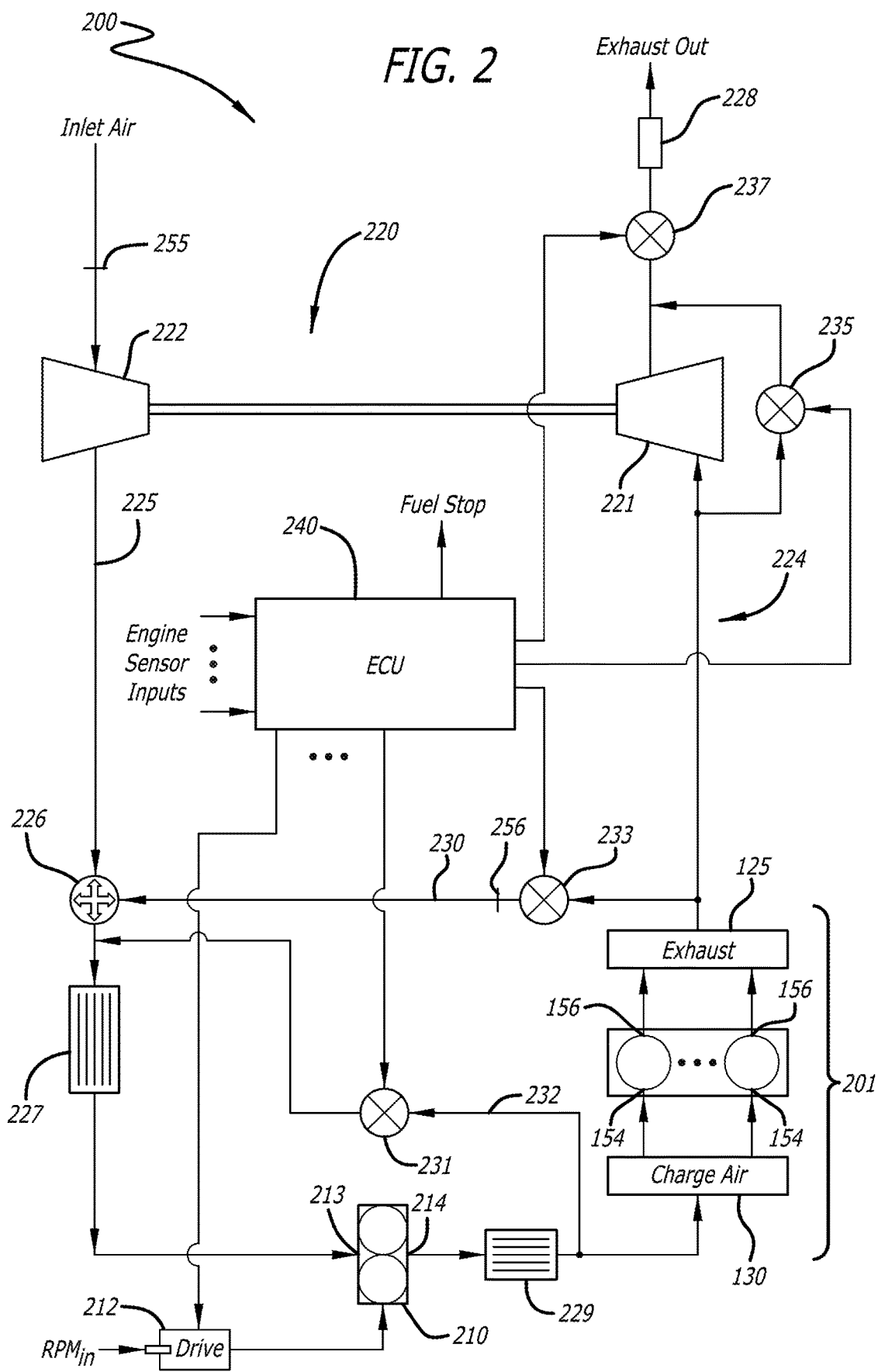
FIG. 2 is a schematic drawing illustrating a control mechanization for control of an air handling system in an opposed-piston engine.

An air handling system 200 for a two-stroke cycle, opposed-piston engine 201 such as the engine illustrated by FIG. 1 is shown in the schematic diagram of FIG. 2. The air handling system 200 includes a supercharger 210 which receives input rotary power from a drive unit 212. The supercharger 210 includes an inlet 213 and an outlet 214. The air handling system 200 may also include a turbocharger 220 with a turbine 221 and a compressor 222. The turbine 221 is coupled to an exhaust channel 224 and the compressor 222 is coupled to a charge air channel 225. The turbine 221 is spun by exhaust gas expelled from the exhaust ports 156 of the engine 201 and transported through the exhaust channel 224. This spins the compressor 222, causing it to generate charge air by compressing inlet air that flows into the charge air channel. Compressed charge air output by the compressor 222 is transported through the charge air channel 225 to a charge air cooler 227. In this configuration, the supercharger 210 constitutes a second stage of compression in the air handling system 200 (following the compressor 222). In any case, the supercharger 210 compresses air in the charge air channel and provides compressed charge air (also called "boost") to the intake ports 154 of the opposed-piston engine. In some instances, a charge air cooler 229 may be provided to cool the output of the supercharger 210. Optionally, the air handling system may include an EGR loop 230 to transport exhaust products from the exhaust channel 224 to the charge air channel 225 via an EGR mixer 226.

The exhaust channel 224 includes an exhaust aftertreatment system 228 downstream of the turbine 221. Exhaust gas flowing from the outlet of the turbine 221 flows through devices of the aftertreatment system 228 and, from there, out of a tailpipe. The aftertreatment system 228 may be constituted of one or more aftertreatment devices. For example, the aftertreatment system 228 may include one or more devices to convert components such as soot, NOx, and unburned hydrocarbons in the exhaust gas into harmless compounds by thermally-driven processes that may include one or more of catalyzation, decomposition, and filtration. In this regard, the aftertreatment system may include a diesel oxidation catalyst (DOC) device, a diesel particulate filter (DPF) device, a selective catalytic reduction (SCR), and/or an ammonia slip catalyst (ASC) device. Such an aftertreatment system would be comparable to a typical exhaust after-treatment system on a commercial heavy duty diesel four-stroke engine. The heat that causes aftertreatment devices of the aftertreatment system to operate is obtained from the exhaust gas itself, and the devices operate most effectively when exhaust gas temperatures are relatively high.

Control of the gas transport configuration of the air handling system is implemented by a mechanization that includes a programmable ECU (engine control unit) 240, air handling processes executed on the ECU, air handling valves and associated actuators, the supercharger 210, and engine sensors. The ECU 240 is programmed to execute fuel handling algorithms and air handling algorithms under various engine operating conditions. Such algorithms are embodied in control modules that are part of an engine systems control program executed by the ECU 240 while the engine is operating. For a common rail direct injection system with which the engine may be equipped, the ECU 240 can control injection of fuel into the engine's cylinders by issuing rail pressure commands and injector commands.

Air handling system control is exercised by settings of variable valves. In this regard, for example, a supercharger bypass valve 231 (also referred to as a "recirculation" or "shunt" valve) bleeds charge air produced by the supercharger 210 through a bypass channel 232 so as to modulate charge air pressure, and dampen surges, at the intake ports 154. An EGR valve 233 adjusts the amount of exhaust gas that is transported through the EGR loop 230 to the charge air channel 225 for control of emissions. A wastegate valve 235 shunts exhaust gas around the turbine 221 in order to control the amount of exhaust gas flowing through the turbine 221, thereby modifying the turbine work and the exhaust gas temperature downstream of the turbine. A backpressure valve 237 regulates exhaust pressure at the turbine outlet in order to increase the gas pressure inside the engine and warm the engine quickly during start-up. For fast, precise automatic operation, it is preferred that these and other valves in the air handling system be high-speed, computer-controlled devices, with continuously-variable settings. The ECU 240 is in control communication with actuators (not shown) that operate the valves in response to ECU-issued valve-setting commands. In cases where the supercharger 210 is operated by a variable drive, the ECU 240 also controls gas transport by issuing drive commands to actuate the supercharger drive 212. And, in those instances where the turbine 221 may be configured as a variable geometry device, the ECU 240 also controls the transport of gas by issuing VGT commands to set the aspect ratio of the turbine.

The ECU 240 monitors air handling system operating conditions by way of various air handling sensors. In this regard, such sensors may include, without limitation, accelerator position, engine speed, fuel rail pressure, mass airflow, mass EGR flow, intake manifold, exhaust manifold, supercharger inlet, supercharger outlet, coolant temperature, and so on. For purposes of this specification these and other sensors may comprise physical measurement instruments and/or virtual systems.

In most cases, to obtain the rotary power necessary to its operation, the supercharger 210 is directly coupled to the engine-usually via a crankshaft-driven drive apparatus. In these cases the speed of the supercharger is dependent on the speed of the engine. In some instances, the drive 212 may be equipped with a transmission that enables the supercharger to be driven, under command of the air handling control mechanization, at a continuously-, or incrementally-, variable speed, independently of a crankshaft. In some of these instances, the supercharger bypass valve 231 may be redundant. That is to say, the greater the variability in supercharger speed afforded by the variable-speed drive, the less likely a bypass valve would be needed to modulate boost pressure. However, there may be instances wherein a drive unit is constructed to provide a limited number of speeds (two speeds, for example) and flexibility in control of boost pressure may require the operations of the supercharger bypass valve 231.

Under control of an air handling process executed by the ECU 240, exhaust temperature management is provided by reducing the flow of air through the engine in order to maintain effective operation of thermally activated devices of the aftertreatment system of an opposed-piston engine. The desired result is obtained by taking advantage of the fact that such an opposed-piston engine has negligible internal pumping. Instead one or more external devices are provided for this purpose. In many cases the preferred pumping devices comprise the supercharger and the turbocharger. When the engine is decelerated in a moving vehicle (or motored in a dynamometer), only the supercharger continues to push (i.e., pump) air through the engine, often through one or more charge air coolers. With nothing more, one would expect the continued flow of air unheated by combustion to cool thermally-actuated aftertreatment devices and make them ineffective—causing emission of undesirable exhaust components during subsequent acceleration until the devices are brought to their effective operating temperatures.

FIG. 2 shows how this undesirable effect may be reduced or eliminated in an opposed-piston engine operated in a two-stroke cycle mode. Inlet air flows form the compressor 222 into the supercharger 210 through the charge air cooler 227. The supercharger 210 may be driven using a 2-speed drive in order to control the drive ratio between the engine crankshaft to which the drive is coupled and the input shaft of the supercharger 210. The supercharger 210 may also act as a pump to draw recirculated exhaust through the EGR loop 230. Charge air (with or without recirculated exhaust) flows through the supercharger 210 into the engine intake manifold 130 through the charge air cooler 229. The supercharger bypass valve 231 enables the ECU 240 to accurately control the mass airflow going into the engine, and therethrough to the exhaust subsystem. All of the pumping work required to move the mass of air is provided by the turbocharger 222 and the supercharger 210. Pistons do not contribute to pumping. During deceleration or motoring when the exhaust enthalpy is negligible, the supercharger 210 does virtually all of the pumping. As a result, during deceleration or motoring, it is possible to significantly reduce the cold air flow going into the exhaust subsystem through the engine by controlling the position of the supercharger bypass valve 231. During deceleration or motoring this reduction can contribute to keeping the aftertreatment system 238 of the opposed-piston engine warm unlike four-stroke engines in which piston motion continues to pump cold air through the aftertreatment system 238. Although FIG. 2 shows the aftertreatment system 228 located on the downstream side of the backpressure valve 237, this is not the only location where this desirable effect may be produced. The benefits of reducing cold airflow during deceleration or motoring may be realized when the components of the aftertreatment system 238 are situated between the downstream side of the wastegate valve 235 and the downstream side of the backpressure valve.

Figure 3:
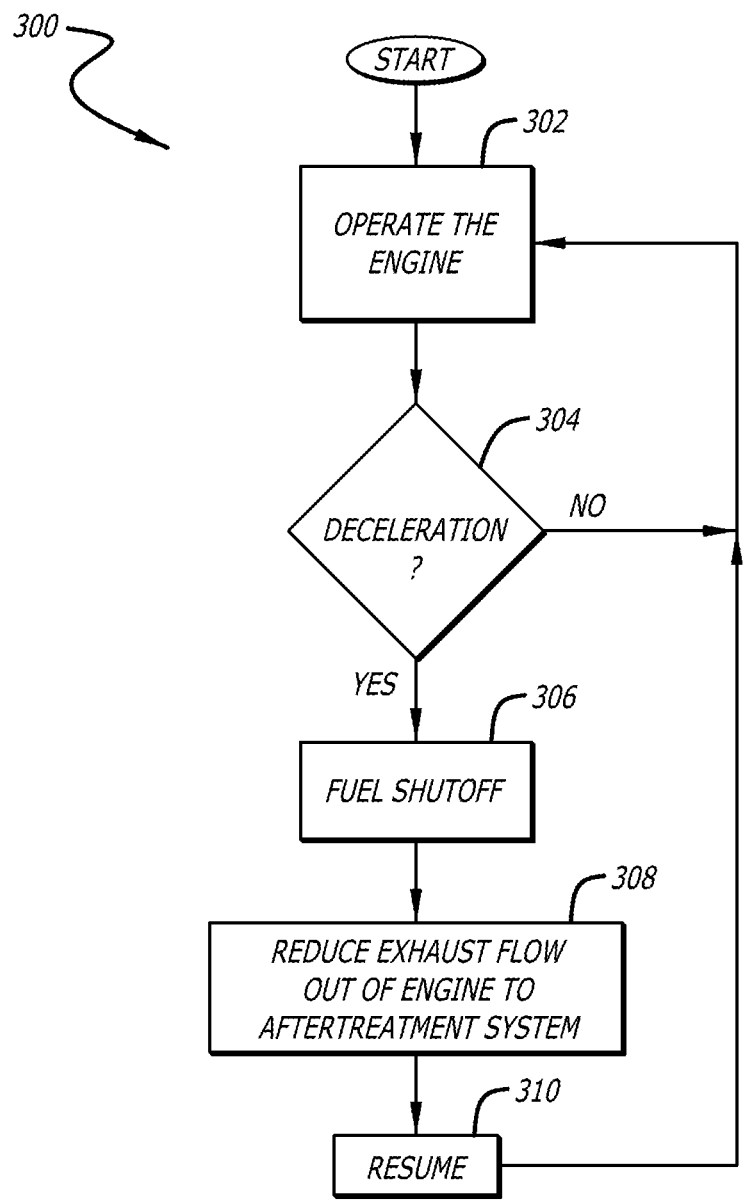
FIG. 3 is a flow diagram showing a process for maintaining a thermal state of mass exhaust flow sufficient to sustain thermal activation of one or more aftertreatment system devices of the air handling system of an opposed-piston engine during a deceleration or motoring condition of engine operation.

FIG. 3 illustrates the above-described process as a method of airflow control for thermal management of aftertreatment devices of an opposed-piston engine, which may be executed by the ECU 240 during two-stroke operation of an opposed-piston engine equipped with an air handling system such as that of FIG. 2. The airflow control process 300 is initiated at 302 by operation of the engine either in a vehicle or a dynamometer. Operation of the engine may include injecting fuel into the engine while operating the engine in a two-stroke cycle mode, operating the supercharger to provide a mass airflow into the engine, and transporting a mass exhaust flow from the engine to the aftertreatment system.

When the engine is decelerated or motored at 304, fueling of the engine is shut at 306 by one or more fuel stop commands (best seen in FIG. 2). At 308, exhaust flow out of the engine into the exhaust subsystem is reduced by reducing mass airflow into the engine, which may be accomplished by reduction of airflow out of the supercharger 210. In the preferred embodiment, this reduction is accomplished by opening the bypass valve 231, which causes charge air to be circulated or shunted from the outlet 214 to the inlet 213 of the supercharger. As per FIG. 2, when the recirculated charge air is diverted into the bypass channel 232 downstream of the charge air cooler 229 and returned to the supercharger 210 via the inlet of the charge air cooler 227, the combined cooling effect of the two coolers on the reduced air mass delivered to the aftertreatment exhaust subsystem is minimized. In other implementations, the bypass channel 232 can be modified to obtain the output of the supercharger from a point between the supercharger outlet 214 and the inlet of the charge air cooler 229. Upon resumption of combustion by the engine at 310, the control process returns to 302.

Variations on the airflow control process of FIG. 3 may be implemented. For example, when the supercharger bypass valve 231 is opened during deceleration or motoring the backpressure valve 237 may be partially or fully closed. Further, when the supercharger bypass valve 231 is opened and the backpressure valve 237 is closed, the EGR valve 233 may be opened. Opening the bypass channel and the EGR loop may allow for lower restriction and even lower supercharger loads. If the drive 212 is equipped with a clutch, the drive may be de-clutched to reduce the supercharger rotation speed to zero, which may eliminate all pumping from the engine and essentially cut off exhaust flow. Alternatively, If the supercharger drive is variable, a lower ratio can be selected.

A surprising result of these strategies may be that the engine motoring torque or engine drag may be reduced enough to allow the vehicle to roll without power for a longer distance and thereby reduce fuel consumption. Further with the exhaust backpressure valve remaining closed, the engine drag can be modulated to provide a desired level of deceleration of the vehicle or to compensate for other vehicle loads to meet vehicle drivability requirements.

The desired exhaust management strategy can be triggered based on a variety of parameters including reduction of the fuel flow request to zero. This strategy can be enabled within a given vehicle speed range, within a given engine speed range, within a given coolant temperature range, within a given catalyst temperature range, within a given ambient temperature range, and/or within a given ambient pressure range.

In the case when there is a specific request for a different engine drag torque, a model of the supercharger power consumption based on supercharger inlet and outlet pressure and temperature may be used to adjust the bypass valve and/or EGR valve to achieve the requested drag torque.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims.

It is also intended that the sequence of steps, acts, or states shown in figures are only for illustrative purposes and are not intended to be limited to any particular sequence of steps. As such, those skilled in the art can appreciate that these steps, acts, or states can be performed in a different order while implementing the same method.

The invention claimed is:

1. A method of operating a two-stroke cycle, opposed-piston engine comprising a control unit to execute the method, a supercharger coupled to pump air to cylinders of the engine through a charge air cooler, a bypass channel to recirculate charge air from an outlet of the supercharger to an inlet of the supercharger, and an aftertreatment system of thermally-activated devices coupled to receive exhaust from the cylinders, the method comprising:

injecting fuel into the engine while operating the engine in a two-stroke cycle mode;

operating the supercharger to provide a mass airflow into the engine;

transporting a mass exhaust flow from the engine to the aftertreatment system;

ceasing fuel injection into the engine while motoring the engine; and, maintaining a thermal state of the mass exhaust flow sufficient to sustain thermal activation of one or more of the aftertreatment system devices during motoring of the engine by recirculating a portion of the mass airflow through the bypass channel to the inlet of the supercharger.

2. The method of claim 1, wherein the portion of the mass airflow recirculated to the inlet of the supercharger is obtained downstream of an outlet of the charge air cooler.

3. The method of claim 2, further including reducing the mass exhaust flow to the aftertreatment system during motoring of the engine.

4. The method of claim 1, wherein the mass airflow includes recirculated exhaust flow and wherein the portion of the mass airflow recirculated to the supercharger is obtained downstream of the charge air cooler.

5. The method of claim 4, further including reducing the mass exhaust flow to the inlet of the aftertreatment system during motoring of the engine.

6. The method of claim 5, further including reducing the recirculated exhaust flow during motoring of the engine.

7. A method of operating a fuel-injected, opposed-piston engine comprising a control unit to execute the method, a supercharger coupled to pump air to cylinders of the engine through a charge air cooler, a bypass channel to recirculate charge air from an outlet of the supercharger to an inlet of the supercharger, and an aftertreatment system of thermally-activated devices coupled to receive exhaust from the cylinders, the method comprising:

injecting fuel into the engine while operating the engine in a two-stroke cycle mode;

operating the supercharger to provide a mass airflow to the engine;

transporting a mass exhaust flow from the engine to an inlet of the aftertreatment system;

ceasing fuel injection into the engine while operating the engine; and, maintaining a thermal state of the mass exhaust flow sufficient to sustain thermal activation of one or more of the aftertreatment system devices during cessation of fuel injection by recirculating a portion of the mass airflow through the bypass channel to the inlet of the supercharger.

8. The method of claim 7, wherein the mass airflow to the engine is reduced by recirculating a portion of the mass airflow obtained downstream of the outlet of the charge air cooler to the inlet of the supercharger.

9. The method of claim 8, further including reducing the mass exhaust flow to the aftertreatment system during cessation of fuel injection.

10. The method of claim 7, wherein the mass airflow includes recirculated exhaust flow.

11. The method of claim 10, further including reducing the mass exhaust flow to the aftertreatment system during cessation of fuel injection.

12. The method of claim 11, further including reducing the recirculated exhaust flow during cessation of fuel injection.

13. A method of operating a two-stroke, opposed-piston engine comprising a control unit to execute the method, a supercharger coupled to pump air to cylinders of the engine through a charge air cooler, a bypass channel to recirculate charge air from an outlet of the supercharger to an inlet of the supercharger, and an aftertreatment system of thermally-activated devices coupled to receive exhaust from the cylinders, the method comprising:

injecting fuel into the engine while operating the engine in a two-stroke cycle mode;

operating the supercharger to provide a mass airflow to the engine;

transporting a mass exhaust flow from the engine to an inlet of the aftertreatment system;

detecting an exhaust flow reduction condition of engine operation;

ceasing fuel injection in response to the exhaust flow reduction condition of engine operation; and, maintaining a thermal state of the mass exhaust flow sufficient to sustain thermal activation of one or more of the aftertreatment system devices during the exhaust flow reduction condition of operation by recirculating a portion of the mass airflow through the bypass channel to the inlet of the supercharger.

14. The method of claim 13, wherein the mass airflow to the inlet of the engine is reduced by recirculating a portion of the mass airflow to the inlet of the supercharger obtained downstream of the outlet of the charge air cooler.

15. The method of claim 14, further including reducing the mass exhaust flow to the aftertreatment system during the exhaust reduction condition of operation.

16. The method of claim 13, wherein the mass airflow includes recirculated exhaust flow.

17. The method of claim 16, further including reducing the mass exhaust flow to the inlet of the aftertreatment system during the exhaust reduction condition of operation.

18. The method of claim 17, further including reducing the recirculated exhaust flow during the exhaust reduction condition of operation.

19. The method of claim 7, wherein the mass airflow recirculated to the inlet of the supercharger is obtained downstream of an outlet of the charge air cooler.

20. The method of claim 13, wherein the mass airflow recirculated to the inlet of the supercharger is obtained downstream of an outlet of the charge air cooler.

* * * * *